US006765593B2

(12) United States Patent
Simmons

(10) Patent No.: US 6,765,593 B2
(45) Date of Patent: Jul. 20, 2004

(54) METHOD AND SYSTEM FOR EVALUATING SERVICEABILITY OF A COMPUTER SYSTEM

(75) Inventor: Hoyt Conis Simmons, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 513 days.

(21) Appl. No.: 09/768,584

(22) Filed: Jan. 24, 2001

(65) Prior Publication Data

US 2002/0097254 A1 Jul. 25, 2002

(51) Int. Cl.[7] .............................................. G06F 13/70
(52) U.S. Cl. ..................................... 345/763; 345/765
(58) Field of Search ................................ 345/763, 765, 345/764, 744, 265, 762; 707/104.1, 104.2; 705/11, 7, 10

(56) References Cited

U.S. PATENT DOCUMENTS

| | | | |
|---|---|---|---|
| 4,970,725 A | | 11/1990 | McEnroe et al. |
| 5,561,760 A | | 10/1996 | Ferris et al. |
| 6,009,246 A | | 12/1999 | Chandra et al. |
| 6,065,133 A | | 5/2000 | Draber |
| 6,510,427 B1 | * | 1/2003 | Bossemeyer, Jr. et al. ...... 707/6 |
| 6,557,008 B1 | * | 4/2003 | Temple, III et al. ..... 707/104.1 |
| 6,604,084 B1 | * | 8/2003 | Powers et al. ................. 705/11 |

* cited by examiner

Primary Examiner—Cao Kevin Nguyen
(74) Attorney, Agent, or Firm—Sawyer Law Group

(57) ABSTRACT

A method and system for evaluating the serviceability of a system is disclosed. The method and system include obtaining a comparison of the system with a plurality of criteria and calculating at least one serviceability score based on the comparison. The comparison includes an objective measure of the serviceability of the system for each of the plurality of criteria.

36 Claims, 8 Drawing Sheets

METHOD AND SYSTEM FOR EVALUATING SERVICEABILITY OF A COMPUTER SYSTEM

FIELD OF THE INVENTION

The present invention relates to service of customers' systems, and more particularly to a method and system for evaluating the serviceability of a system, particularly a computer system.

BACKGROUND OF THE INVENTION

When systems, such as computer systems, are provided to a customer, there is always the possibility that some portion of the system will fail. For example, although a lap top computer and a server are very different computer systems, each might fail under certain conditions. The ease with which the system can be serviced in the face of such a failure or maintained is known as the serviceability of the system.

Serviceability can be broken into at least three categories. The three categories are customer self help, support enablement and service enablement. Customer self help allows a customer to address a problem without intervention by a manufacturer. Thus, customer self help features are those which assist the customer in resolving questions, concerns, perceived problems and/or product failures. Serviceability features that might be provided for customer self help include providing manuals for or help features on a computer system. Support enablement allows a customer to solve problems with the aid of the manufacturer, for example through a help line. Thus, support enablement features are those which assist the help center or support center for the manufacturer in their effort to resolve the customer's problem remotely. Serviceability features that might be provided for support enablement include clearly marking certain parts which are more likely to fail so that a remote determination of the failed part can be made by the service engineer manning the help line. In service enablement, the manufacturer solves the problem for the client, for example through a visit to the customer by a service engineer or by having the customer return the system to the manufacturer. Serviceability features that might be provided for service enablement include placing a part which is likely to fail in a location that is relatively easy to reach.

The serviceability of the system is a consideration a customer may take into account in purchasing the system and is a factor the manufacturer must account for in order to determine how to allocate resources towards servicing the system. Serviceability is particularly important in complex or expensive systems, such as networks, which a customer relies upon or which the customer expects to be reliable or rapidly serviced. Thus, it is desirable to ensure that the serviceability of a system meets certain standards and to increase the serviceability of a system when a new version of the system is developed. Furthermore, it is desirable to improve the serviceability of a system in the three categories of customer self help, support enablement and service enablement. Improved serviceability is desirable because each time a system breaks down and must be repaired, a customer's business is disrupted. As a result, the customer may lose time and resources due to the loss of the system and due to the repair itself. The length of the disruption depends upon factors such as the ability to predict failures of certain portions of the system, redundant features in the system, the time to diagnose failures and the time to correct failures. These and other factors affect the serviceability of the system. Thus, customers typically desire a system which has improved serviceability.

FIG. 1 depicts a flow chart of a conventional method 10 for improving the serviceability of a system. The method 10 is typically used during development of a system or a new version of the system, but may also be used in improving the system after it has been purchased by a customer. Engineers familiar with the system typically assess the serviceability of the system and make suggestions they believe will result in an improvement in serviceability, via step 12. The assessment may be based on the engineers' knowledge of previous versions of the system, customers' desires and competing products. These and other changes may be made to the system, via step 14. The engineers may then reassess the serviceability of the system and make new suggestions for improvement, via step 16. This process of assessing the serviceability of the system, making changes and reassessing the system is typically repeated, via step 18. Typically, steps 12 through 16 are repeated several times during development and, often, during use of the system by the customer.

Although the serviceability of a system may be improved in this conventional method 10, one of ordinary skill in the art will readily recognize that there are several drawbacks to the conventional method 10. The changes suggested by the engineers and made to the system are typically determined in an ad hoc fashion. There is typically no clear indication, other than the belief of the engineer, that the serviceability of the system will improve through the changes. In addition, there is no indication of how much a particular change might improve the serviceability of the system. Furthermore, there are no clearly definable criteria for evaluating the serviceability of the system. Instead, as described above, it is based on the belief of the engineer. Furthermore, each engineer may have a personal bias as to what changes will improve the serviceability of the system and how much a particular change will improve serviceability. Thus, it is difficult for a manufacturer to accurately and repeatably determine whether serviceability has improved and whether the current level of serviceability is sufficient.

Accordingly, what is needed is a system and method for evaluating the serviceability of a system. The present invention addresses such a need.

SUMMARY OF THE INVENTION

The present invention provides a method and system for evaluating the serviceability of a system is disclosed. The method and system comprise obtaining a comparison of the system with a plurality of criteria and calculating at least one serviceability score based on the comparison. The comparison includes an objective measure of the serviceability of the system for each of the plurality of criteria.

According to the system and method disclosed herein, the present invention provides a tool that provides an objective measure of the serviceability of a system. Thus, the development of the system can be tailored to improve the serviceability of the system.

DETAILED DESCRIPTION OF THE INVENTION

The present invention relates to an improvement in development of systems, particularly computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for evaluating the serviceability of a system is disclosed. The method and system comprise obtaining a comparison of the system with a plurality of criteria and calculating at least one serviceability score based on the comparison. The comparison includes an objective measure of the serviceability of the system for each of the plurality of criteria.

The present invention will be described in terms of certain methods for calculating serviceability scores. However, one of ordinary skill in the art will readily recognize that this method and system will operate effectively for other methods of calculating serviceability scores. In addition, the present invention will be described in terms of certain categories of serviceability and certain criteria. However, one of ordinary skill in the art will readily recognize that this method and system can operate effectively for other categories of serviceability and other criteria.

Figure 1:
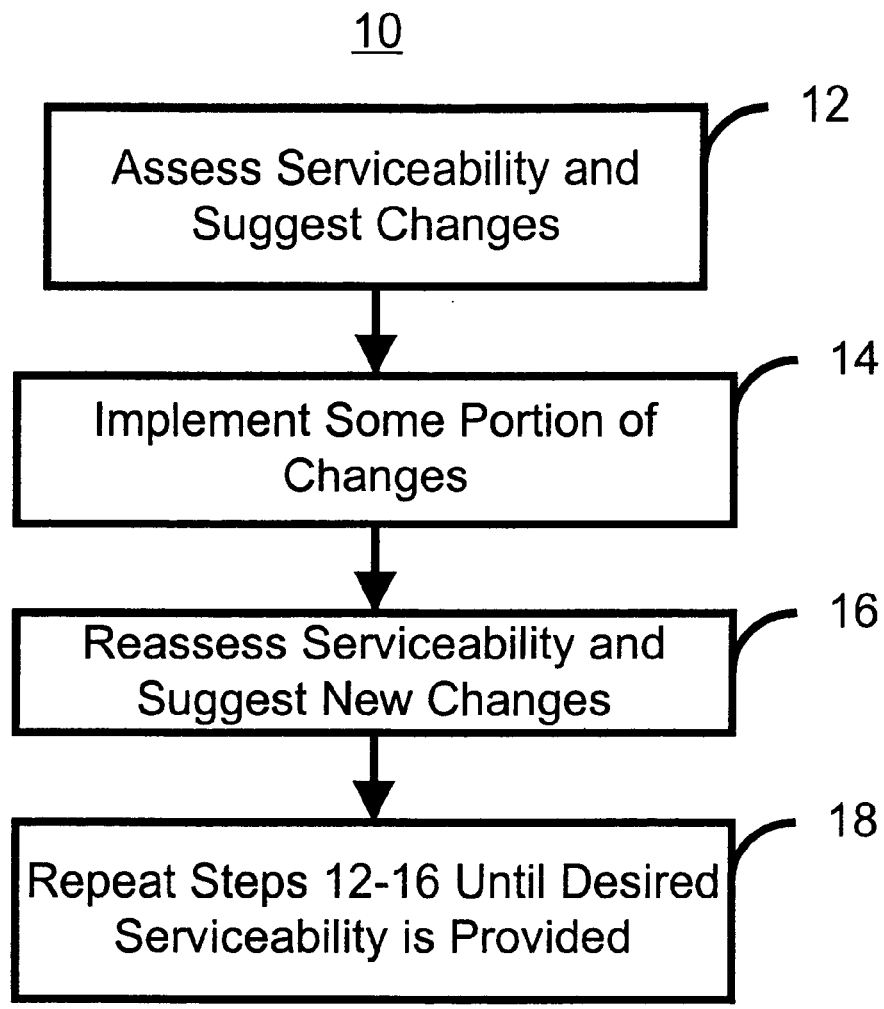
FIG. 1 is a flow chart depicting a conventional method for improving the serviceability of a system.
Figure 2:
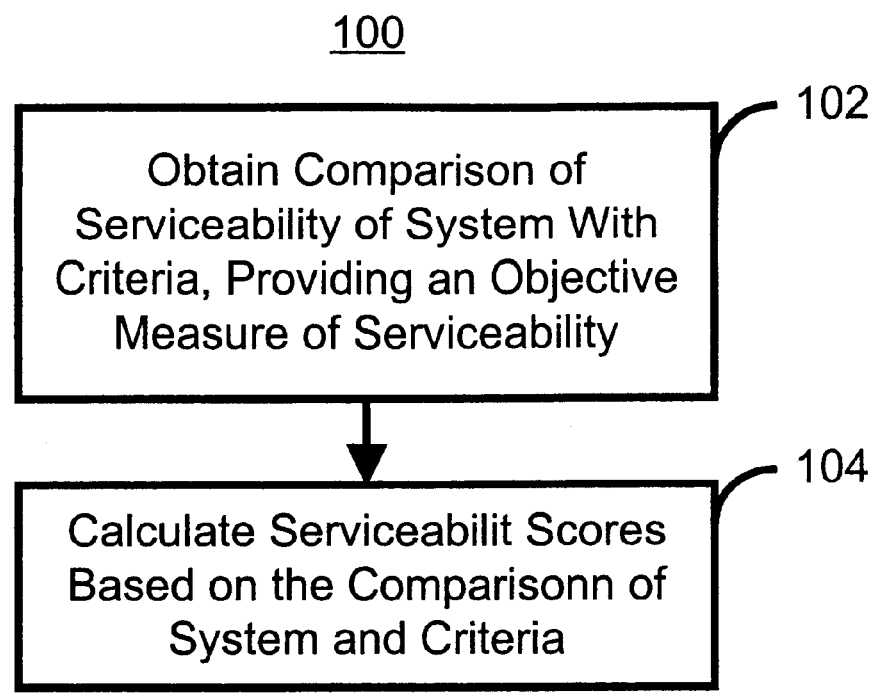
FIG. 2 is a high level flow chart of one embodiment of a method in accordance with the present invention for evaluating the serviceability of a system.

To more particularly illustrate the method and system in accordance with the present invention, refer now to FIG. 2, depicting one embodiment of a method 100 in accordance with the present invention for evaluating the serviceability of a system. The method 100 is preferably implemented using a computer, for example through a graphical user interface. In a preferred embodiment, the method 100 is implemented using a Lotus 123 workbook. The method 100 is also preferably used to evaluate the serviceability of a computer system, such as a laptop, network, or server. A comparison of the system being evaluated and a plurality of criteria is obtained, via step 102. In a preferred embodiment, the comparison is made using questions about the serviceability of the system. For example, the questions could include questions relating to the failure rate of components, the availability of certain materials such as a user's manual. In such an embodiment, answers are obtained for these questions in step 102. The comparison obtained in step 102 also includes an objective measure of the serviceability of the system for each of the plurality criteria. In a preferred embodiment, the objective measure can be obtained because each of the questions is a multiple-choice question. Thus, the answers obtained in the comparison can be restricted to reduce the user's personal biases. In addition, the answers can be quantified. A serviceability score is calculated based on the comparison, via step 104. The serviceability score obtained in step 104 is thus also an objective indication of the serviceability of the system.

The serviceability score is based upon an objective measure of the serviceability of the system. Thus, using the method 100, the serviceability of the system can be evaluated while reducing the effect of the bias of an evaluator, such as a service engineer. As a result, the system can be evaluated by different individuals substantially without concern that differences in the serviceability score are due primarily to differences in the individuals evaluating the system. Using the serviceability score determined in step 104, the system can be compared against other systems, against previous versions of the system, or against a benchmark which the system is desired to meet or exceed. Thus, determining whether the serviceability of the system has improved or reached a particular target is simpler because the serviceability can be expressed in the serviceability score.

Figure 3:
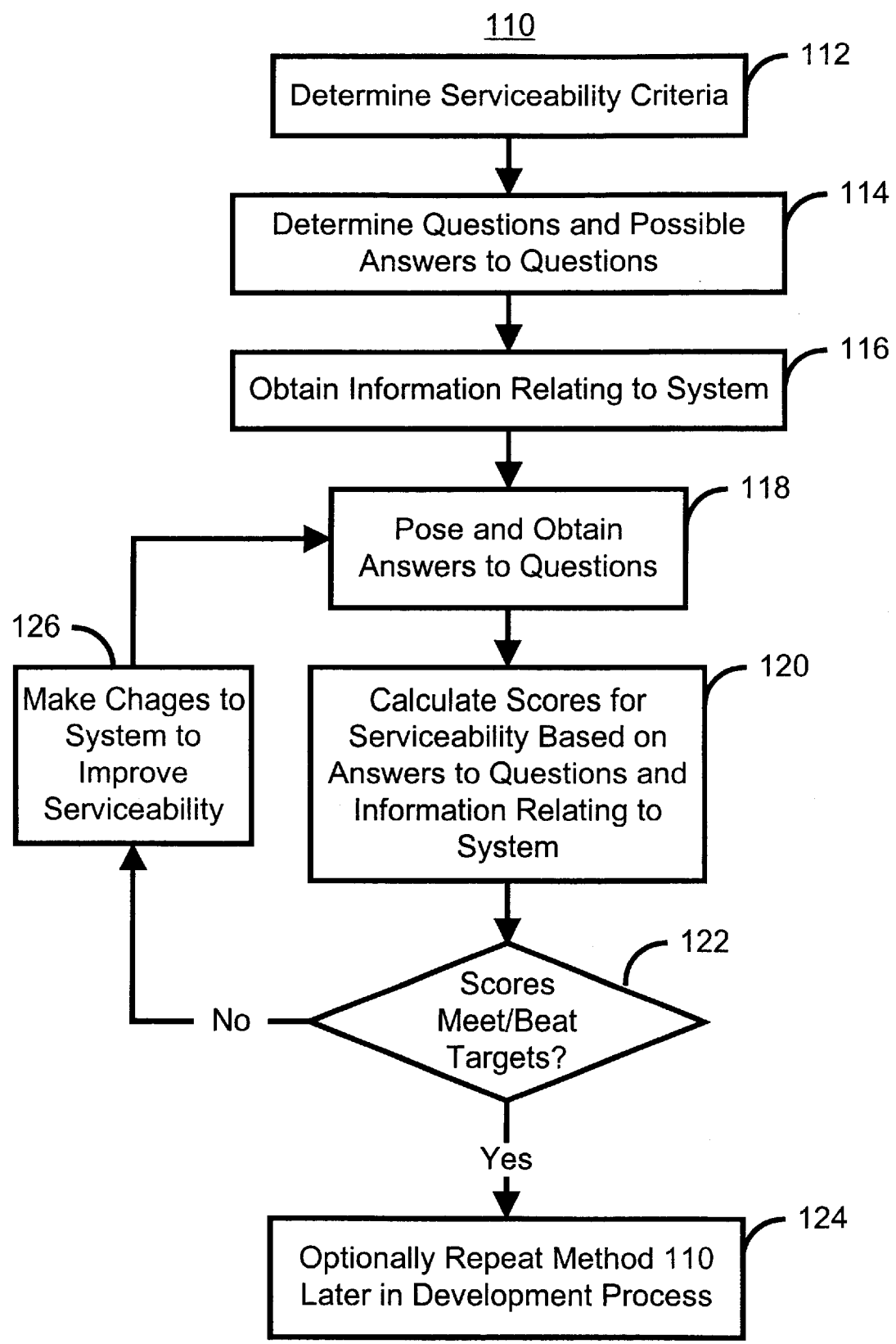
FIG. 3 is a more detailed flow chart of one embodiment of a method in accordance with the present invention for evaluating and improving the serviceability of a system.

FIG. 3 is a more detailed flow chart of one embodiment of a method 110 in accordance with the present invention for evaluating and improving the serviceability of a system. Serviceability criteria are determined, via step 112. Different product lines, or systems, often have different serviceability requirements. For example, a laptop computer has different parts and is subject to different expectations than a server. Thus, step 112 allows the criteria to be customized for systems. In a preferred embodiment, step 112 includes collecting serviceability information from predecessors of the system to be evaluated and from competing products. As discussed below, the serviceability evaluation involves certain replaceable parts. Thus, step 112 includes obtaining information about the replaceable parts. Obtaining information about the replaceable parts may include each part's failure rate and quantity. In addition, a mathematical value for the part's importance based on the part's failure rate and quantity is calculated in step 112. This value is used in calculating the serviceability score for the part, as described below. Step 112 also preferably includes setting targets for serviceability scores, described below, based on the serviceability information collected. Thus, to a large extent, the criteria are expressed in the targets for serviceability scores. In a preferred embodiment, forty-four targets are set for each replaceable part about which questions, described below, are asked. Also in a preferred embodiment, thirty-three targets are set for system level serviceability, described below. However, in another embodiment, the number of targets can be different.

The questions to be asked are determined, via step 114. Thus, the questions as well as the targets described above, express the criteria selected for the system. In a preferred embodiment, the questions to be asked relate to the serviceability of specific parts within the system, as well as to the overall system level serviceability. The system level serviceability is a measure of the overall serviceability of the system and may not relate to a specific part. In a preferred embodiment, the questions relate to up to twenty-five parts, each of which can be replaced in the field. However, in an alternate embodiment, the number of parts about which questions are asked can be different. Thus, step 114 also includes selecting to which parts of the system the questions relate. In a preferred embodiment, the questions relate to parts which comprise at least ninety percent of the system's projected failures. In a preferred embodiment, each of the questions can also have a weight. Preferably, the weight given to each question can range from a low of zero to a high of ten. Each question also has a limited number of possible answers. The possible answers are predetermined. Preferably, most questions can be answered with a "yes" or a "no." In such an embodiment, the remainder of the questions can be answered by picking a numerical value. For example, an answer could be any number (possibly including fractions) between one and ten. Typically, numeric answers are used to more accurately reflect minor changes in the serviceability of the system. "Yes" or "no" questions are also preferred because there is less opportunity to bias the outcome. In addition, an answer to each of the questions determined in step 112 preferably has a possible number of points. For example a "yes" may be worth ten points, while a "no" may be worth zero points. If the question has a weight of five, then up to fifty points or as few as zero points may be received for an answer to the question. Thus, the answers to the questions indicate a comparison between the system and the criteria. In addition, the questions preferably provide an objective measure of the comparison through the points received for an answer each question.

The questions formulated in step 114 are also preferably organized into three categories: customer self help, support enablement and service enablement. In a preferred embodiment the questions formulated in step 114 relate to serviceability features in the customer self help, the support enablement and the service enablement categories. Thus, the questions posed in the customer self help category features include system messages such as text or numeric messages, audio beep codes, lighted or blinking LED's, lighted or blinking icon's, specific failed part indicators, customer/user documentation, hard copy users' manual, user assistance CD-ROM, online user documentation, customer level diagnostics/trouble shooting procedures, diagnostic packages (ROM based, CD ROM, DOS based, or OS based concurrent), online support pages, online diagnostic knowledge based systems. The serviceability features in the customer self help category also preferably include customer replaceable units (CRUs) such as ease of diagnosing failure (individual part failure light, simplified diagnostics, etc.) and ease of part replacement (tool-less replacement, Hot Plug, etc.). In the support enablement category, the serviceability features include remote problem determination such as the ability to determine the product's warranty or service level entitlement status, the ability to determine the product configuration, the ability to determine whether the problem is real or perceived, the ability to determine whether the problem is hardware, software, or firmware, the ability isolate failure, the ability to remotely resolve firmware or software problems and the ability to determine the failed part information (part number, EC level, etc.). The service enablement serviceability features include the ability to quickly access to failed system and failed part information including the ability to gather failed system/part information without taking the system off line and the ability to gather failed system/part information if system is not operative (dead). The service enablement serviceability features also include the ability to gather system configuration information without system disruption, the ability to gather system error and event logs without a system disruption, the ability to isolate failure to a single part such as whether the ailing part has visual indicator to alert failure mode. The serviceability features for service enablement also include the ability to quickly replace the failed part including whether the part is replaceable with minimal tools and whether the part is replaceable without removing non failing parts (removal path).

Note that steps 112 and 114 are preferably determined once for the system or product line. Thus, in subsequent iterations of the method 110, steps 112 and 114 may be omitted.

Information relating to parts of the system is obtained, via step 116. The information can be used to predict the behavior of the system and, based on questions asked and answered as described below, to calculate a serviceability score. For example, the information obtained may include the failure rate of certain parts of the system, whether redundant parts are provided, how many redundant parts are provided and which parts have redundant parts. In addition, the time to replace a part and other information may be obtained. This information is preferably obtained in step 116 by asking the user two additional sets of questions. These questions are separated into two sets of questions to match the information availability cycles in the development process. The first set of questions relates to the documentation/software/firmware for the system being evaluated. The second set of questions relate to the mechanicals/hardware for the system being evaluated. Breaking the questions into these sections allows the user of the method and system in accordance with the present invention to focus on a specific group of questions. In some incidents one person may provide the documentation/software/firmware answers and a different person may provide the mechanicals/hardware answers.

The first set of questions for step 116 relate to serviceability information that can generally be answered using items such as the documentation, software or firmware for the system. Final answers to the first set of questions (documents, diagnostics, software, firmware, support services, etc.) are generally not available for review, even in the draft stage, until late in the development cycle. If a product is a follow on product, the evaluator preferably answers the first set of questions assuming the basic attributes will be the same as its predecessor until the user manuals, service manuals, and software are available for evaluation. If the product is a completely new design, the evaluator must request input from the development engineers, documenting the information source. Later, when the user manuals, service manuals, and software are available for evaluation, the user can provide final answers to the first set of questions.

The answers in the second set of questions (mechanicals/hardware) for step 116 are preferably primarily "yes/no" or numeric counts of items such as screws, cable connectors, etc. In addition, the removal and replacement times of individual parts are also preferably provided in step 116. These are preferably performed and timed. In a preferred embodiment, two people of different skill levels perform the removal/replacement process. The average time for the removal/replacement process is used to answer questions regarding removal/replacement times. In the event that the hardware is not available, as in the early part of the development cycle, the method and system in accordance with the present invention utilizes inputs from mechanical drawings the number of connectors, screws, etc, and identifies all parts which are in the removal paths of other parts and leaving the removal time blank. In such a case, step 116 includes calculating an estimated removal time based on the amount of time typically required to remove and replace each screw and each connector identified from the drawing. Once an actual removal/replacement time is keyed in, the method 110 defaults to the actual time in step 116.

Thus, to the extent possible, the questions asked and answered in step 116 have objective answers. In addition, the questions asked in step 116 may change depending on the answers to previous questions. Also in a preferred embodiment, the questions in step 116 are asked by providing a spreadsheet having highlighted regions to the user. The user is then required to fill out the highlighted portions.

The questions determined in step 114 are then posed to the user and answers received, via step 118. Steps 116 and 118 are preferably implemented using a graphical user interface. Also in a preferred embodiment, steps 116 and 118 are implemented utilizing a LOTUS 123™ workbook including a number of spreadsheets. However, nothing prevents steps 116 and 118 from being implemented in another manner. The questions actually posed in step 118 preferably depend upon the answers to previous questions. For example, if a question asks whether a specific part has redundant parts and the user answers "no," then no further questions about the redundant parts are asked. If, however, the user answers "yes" to the same question, then further questions, such as the number of redundant parts, may be asked. Because the user is restricted to the answering the questions using the choices provided, the answers to the questions are an objective measure of the serviceability of the system. Thus, the biases of the user of the method 110 who answers the questions in step 118 are reduced or eliminated from the evaluation of the serviceability of the system.

Serviceability scores are calculated based on the answers to the questions, via step 120. Preferably, the serviceability scores are expressed in percentages and are based on the points obtained for the answer to each question. In a preferred embodiment, scores are calculated for each part, for each category and for the overall system. In a preferred embodiment, each part has a score in each category, each category has a score, and the system has a system level score. The scores calculated in step 120 are an objective indication of the serviceability of the system because the scores are based on questions having objective, quantifiable answers that are tailored for the system.

It is then determined whether the serviceability scores meet or beat the target values, via step 122. If the serviceability scores meet the targets, then in step 122 the method 110 can then be repeated later in the development process, via step 124. In a preferred embodiment, the method 110 is repeated three additional times during the development of the system. If the serviceability scores do not meet the targets, then changes are made to the system based on the serviceability scores, via step 126. Because the serviceability scores are calculated for each part, it can be determined to which portion of the system changes should be made to improve serviceability. For example, if the customer self help serviceability score is low and the customer self help serviceability score for a particular part is very low, customer self help features may be added to that part to improve the serviceability score for the customer self help category. The method then returns to step 118 to pose and receive answers to questions regarding the serviceability. Thus, the serviceability of the system can be reevaluated after the changes are incorporated into the system.

Thus, the method 110 determines serviceability scores in a manner which reduces or eliminates the subjectivity interjected by users of the method 110. As a result, the method 110 can be readily used by different individuals to compare the serviceability of a system to its predecessor or competitors. In addition, the method 110 calculates a plurality of serviceability scores for the system and parts within the system. The serviceability scores are also calculated for multiple categories of serviceability. Thus, a user is able quickly identify what type, or category, of serviceability requires improvement. In addition, because serviceability scores are calculated for individual parts, the part which needs improvement can be rapidly determined and the type of improvement needed can be rapidly determined. Therefore, the method 110 facilitates improvement of the serviceability of a system.

Figure 4:
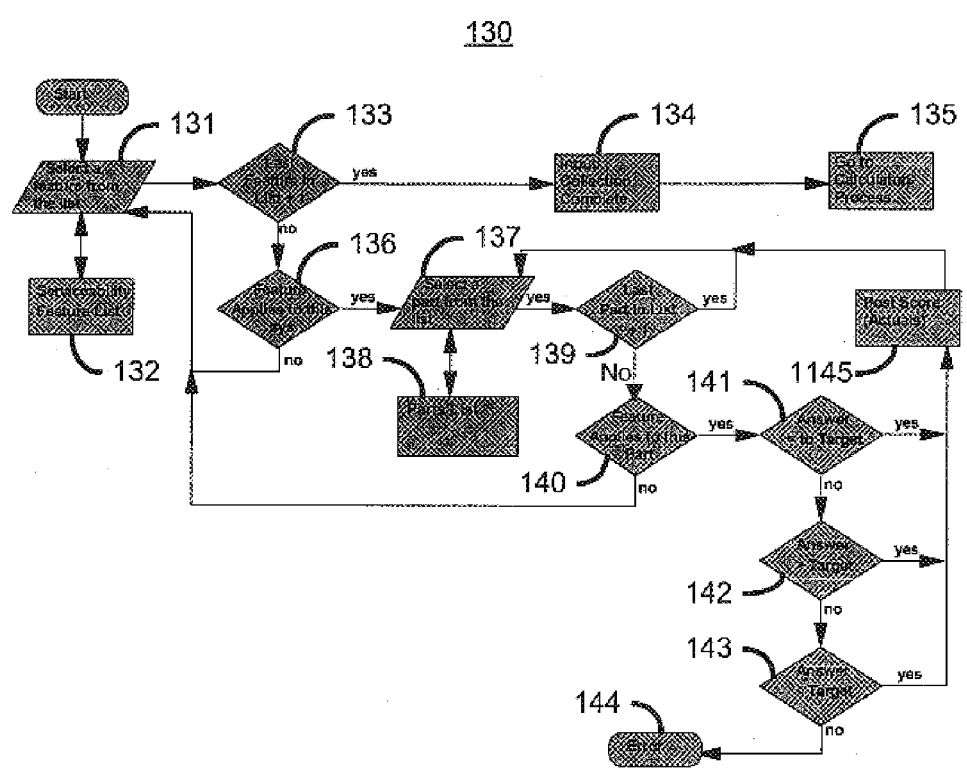
FIG. 4 is a flow chart of a one embodiment of a method for evaluating the serviceability of a system in accordance with the present invention.

FIG. 4 is a flow chart of a one embodiment of a method 130 for evaluating the serviceability of a system in accordance with the present invention. A feature is selected from a serviceability feature list 132, via block 131. Serviceability features can be fit into the categories of customer self help, support enablement and service enablement as described above. It is determined whether the serviceability feature is after the last feature in the list, via block 133. If it is, then the serviceability features have been described and it is determined that input collection has been completed in step 134. The calculation process would then be performed in block 135. The calculation process is described below with respect to FIGS. 5–8.

If the feature is not after the last serviceability feature, then it is determined whether the feature applies to the system being evaluated, via block 136. If the feature does not apply to the system, then another serviceability feature is selected, via block 131. If the feature does apply to the system, then a part is selected from a parts list 138, via block 137. It is then determined whether the part is the last in the list, via block 139. If so, then block 137 is returned to. If the part is not beyond the last part in the list, then it is determined whether the serviceability feature applies to the selected part, via block 140. If not, then another serviceability feature is selected from the list in block 131. If the feature does apply to the part, then it is determined whether the points received for answers for the part is equal to the target, via block 141. If so, then the score for the part is posted via block 145 and another part is selected in block 137. If not, is determined whether the points received for answers are greater than the target, via block 142. If so, then the actual score for the part is posted in block 145 and another part is selected in block 137. If not, it is determined whether the score is less than the target, via block 142. If so, then the actual score for the part is posted in block 145 and another part is selected in block 137. If not, then an error is flagged in step 144.

Figure 5:
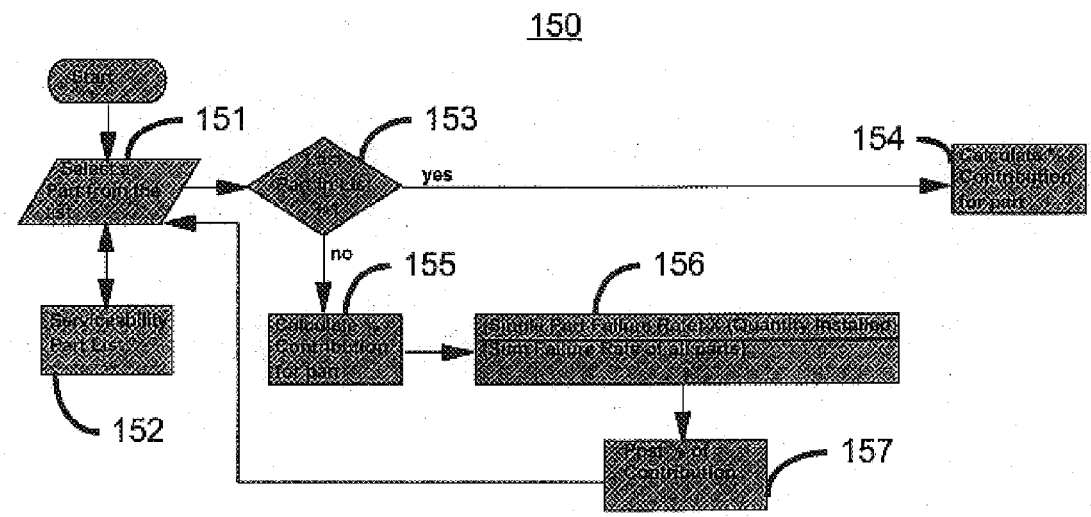
FIG. 5 is a flow chart of one embodiment of a method in accordance with the present invention for calculating the contribution of parts to serviceability scores.
Figure 6:
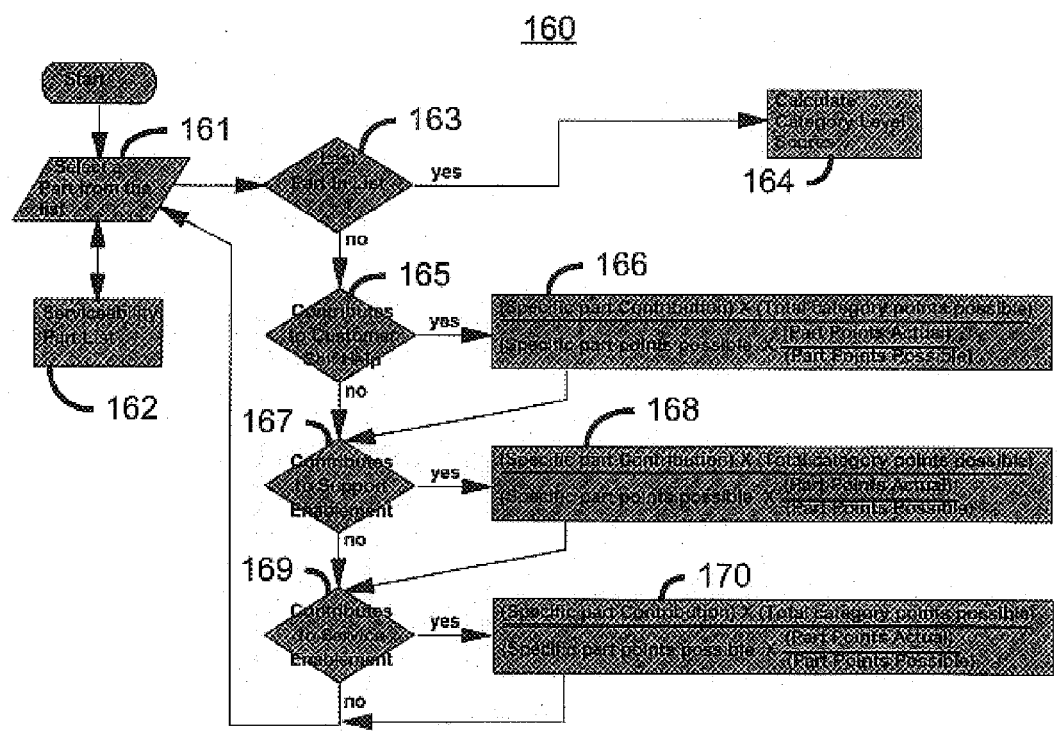
FIG. 6 is a flow chat of one embodiment of a method in accordance with the present invention for calculating part level scores.

FIG. 5 is a flow chart of one embodiment of a method 150 in accordance with the present invention for calculating the contribution of parts to serviceability scores. A part is selected from the parts list 152 about which questions are to be asked, via block 151. It is determined whether the part selected is beyond the last part in the part list 151, via block 153. If so, then the percentage contribution for the part is calculated in block 153. FIG. 6 describes how block 153 will be performed. If the part is not beyond the last part in the parts list 151 then the percentage contribution for the part is to be calculated in block 155. The calculation is made by calculating the failure rate of the single part multiplied by the quantity of parts installed divided by the sum of the failure rate of all parts, in block 156. This contribution is then posted, via block 157. Thus, the score for the part is based on the failure rate of the entire quantity of the part installed versus the total failure rates. Another part is then selected from the parts list 152 as block 151 is returned to.

Figure 7:
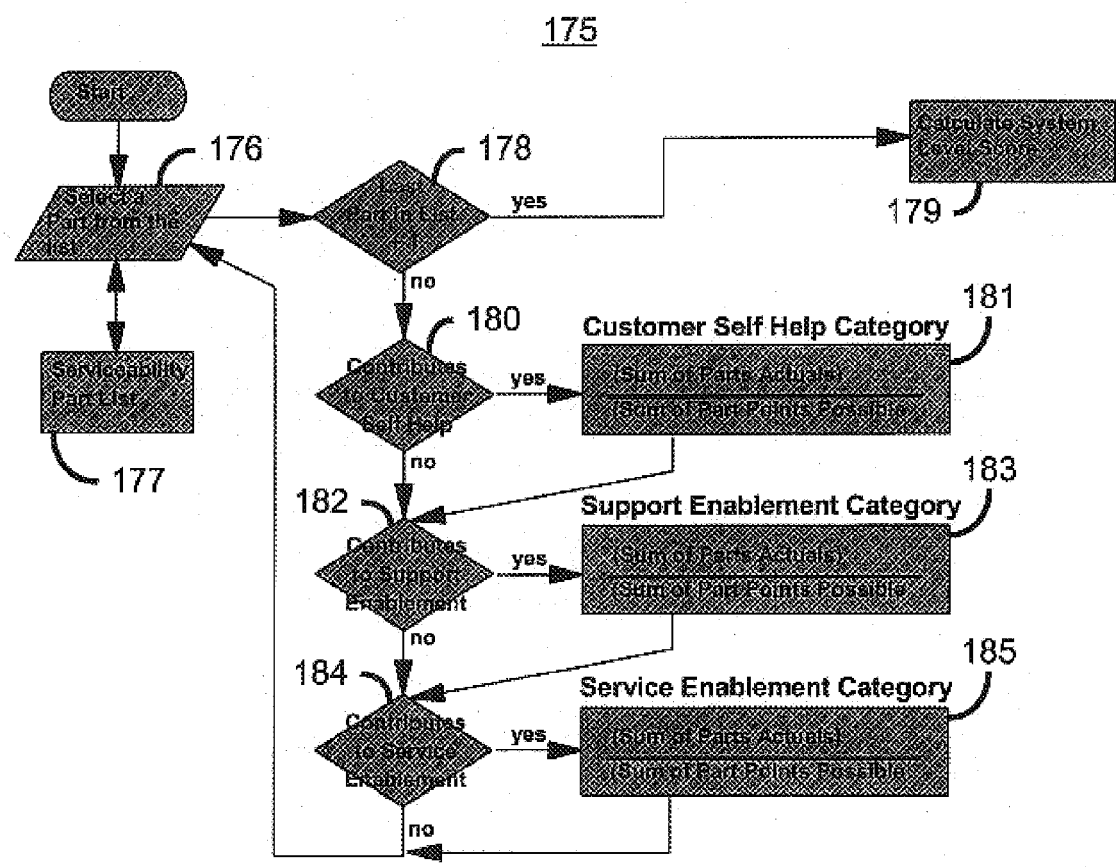
FIG. 7 is a flow chart of one embodiment of a method in accordance with the present invention for calculating serviceability scores for a category of serviceability.

FIG. 6 is a flow chat of one embodiment of a method 160 in accordance with the present invention for calculating part level scores. The method 160 thus performs operations for the block 154 of the method 150. Referring back to FIG. 6, a part is selected from a parts list 162 about which questions are to be asked, via block 161. The parts list 162 is preferably the same as the parts list 152 in the method 150 of FIG. 5. Referring back to FIG. 6, it determined whether the part selected is beyond the last part in the part list 161, via block 163. If so, then the category level scores are to be calculated in block 164. FIG. 7 describes the process for calculating category level scores in block 164.

Referring back to FIG. 6, if the part is not beyond the last part in the list, then it is determined whether the part contributes to customer self help, via block 165. If so, then the contribution of the part is calculated by multiplying the percentage score of the part calculated in the method 150 multiplied by the total number of points possible in the category divided by the actual points contributed by the part, via block 166. The total number of points possible in the category is preferably the sum of the maximum possible points for each question relating to the customer self help category.

If it is determined that the part does not contribute to the customer self help or once the support enablement category score for the part has been calculated, then it is determined whether the part contributes to support enablement, via block 167. If so then the contribution of the part is calculated by multiplying the percentage score of the part calculated in the method 150 multiplied by the total number of points possible in the category divided by the actual points contributed by the part, via block 168. The total number of points possible in the category is preferably the sum of the maximum possible points for each question relating to the support enablement category.

If it is determined that the part does not contribute to the support enablement or once the support enablement score for the part has been calculated, then it is determined whether the part contributes to service enablement, via block 169. If so then the contribution of the part is calculated by multiplying the percentage score of the part calculated in the method 150 multiplied by the total number of points possible in the category divided by the actual points contributed by the part, via block 170. The total number of points possible in the category is preferably the sum of the maximum possible points for each question relating to the service enablement category. Thus, the serviceability scores for individual parts are calculated in a number of categories. These scores may be used in later calculations for the system and to help determine where changes should be made in order to improve the score of a particular part.

Figure 8:
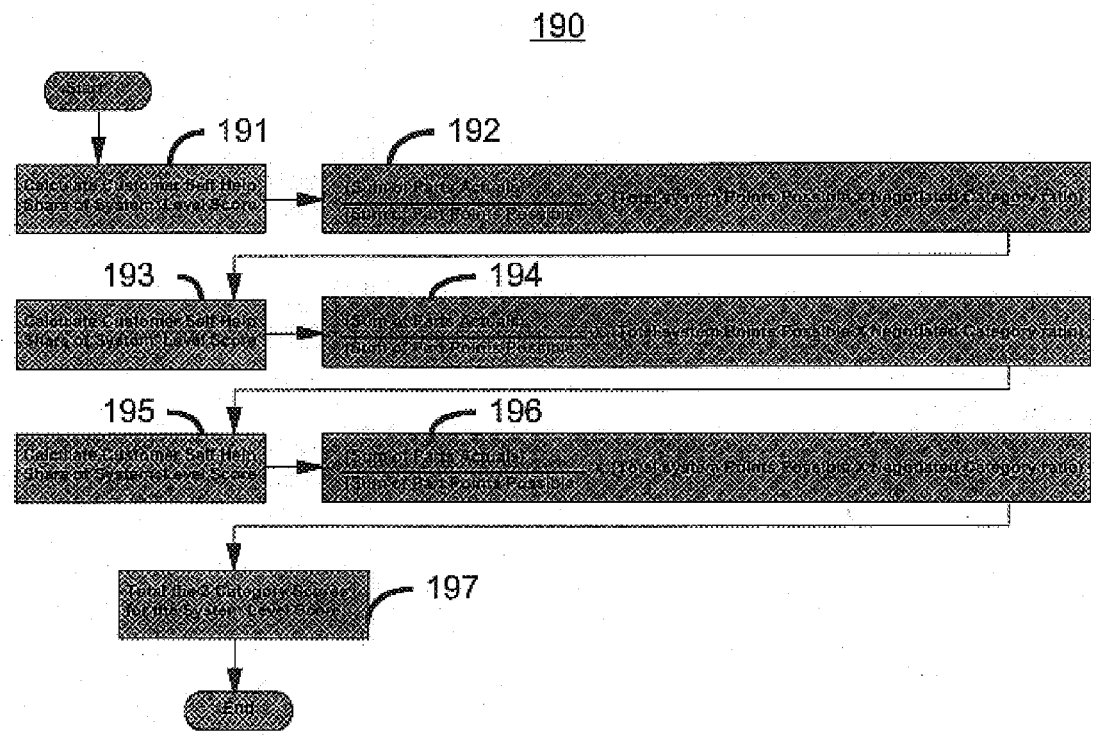
FIG. 8 is a flow chart of one embodiment of a method in accordance with the present invention for calculating system level scores.

FIG. 7 is a flow chart of one embodiment of a method 175 in accordance with the present invention for calculating serviceability scores for a category of serviceability. A part is selected from the parts list 177 about which questions are to be asked, via block 176. The parts list 177 is the same as the parts list 151 and 161. It is then determined whether the part selected is beyond the last part in the list, via block 178. If so, then the system level scores are to be calculated, via block 179. FIG. 8 describes how the system level scores are calculated in block 179.

Referring back to FIG. 7, if the part is not beyond the last part in the list, then it is determined whether the part contributes to customer self help, via block 180. If so, then the customer self help category score is determined, via block 181. The customer self help category score is calculated by dividing the sum of the actual points accumulated for questions answered for each part in the customer self help category by the sum of the possible points for the questions answered for each part in the customer self help category. Thus step 181 may be implemented by maintaining running sums of the actual and of the possible points for each question answered for each part in the customer self help category. In such an embodiment, a running customer self help category score might also be maintained by dividing the current sum of the actual points received for each question answered for each part in the customer self help category by the current sum of the possible points received for each questions answered for each part in the customer self help category.

If the part does not contribute to customer self help or after the customer self help category score is calculated, then it is determined whether the part contributes to support enablement, via block 182. If so, then the support enablement category score is determined, via block 183. The support enablement category score is calculated by dividing the sum of the actual points accumulated for questions answered for each part in the support enablement category by the sum of the possible points for the questions answered for each part in the support enablement category. Thus step 183 may be implemented by maintaining running sums of the actual and of the possible points for each question answered for each part in the support enablement category. In such an embodiment, a running support enablement category score might also be maintained by dividing the current sum of the actual points received for each question answered for each part in the support enablement category by the current sum of the possible points received for each questions answered for each part in the support enablement category.

If the part does not contribute to support enablement help or after the support enablement category score is calculated, then it is determined whether the part contributes to service enablement, via block 184. If so, then the service enablement category score is determined, via block 185. The service enablement category score is calculated by dividing the sum of the actual points accumulated for questions answered for each part in the service enablement category by the sum of the possible points for the questions answered for each part in the service enablement category. Thus step 185 may be implemented by maintaining running sums of the actual and the possible points for each question answered for each part in the service enablement category. In such an embodiment, a running service enablement category score might also be maintained by dividing the current sum of the actual points received for each question answered for each part in the service enablement category by the current sum of the possible points received for each questions answered for each part in the support enablement category. The method 175 returns to step 176 to select another part form the parts list 177. Thus, the method 175 continues until all parts of the system have been processed and, therefore, the category level scores have been calculated. Thus, scores are calculated for each category using the method 175.

FIG. 8 is a flow chart of one embodiment of a method 190 in accordance with the present invention for calculating system level scores. The customer self help portion of the system level score is to be calculated, via block 191. The customer self help portion is calculated in block 192 by dividing the sum of the actual points scored in the category by the sum of the possible points in the category and multiplying this quantity by a total system points possible and by a customer self help negotiated category ratio. The negotiated category ratio is essentially a weight for the category and allows a user to set the relative importance of the categories. The support enablement portion of the system level score is to be calculated, via block 193. The support enablement portion is calculated in block 194 by dividing the sum of the actual points scored in the support enablement category by the sum of the possible points in the support enablement category and multiplying this quantity by a total system points possible and by a support enablement negotiated category ratio. The service enablement portion of the system level score is to be calculated, via block 195. The service enablement portion is calculated in block 196 by dividing the sum of the actual points scored in the service enablement category by the sum of the possible points in the service enablement category and multiplying this quantity by a total system points possible in the and by a service enablement negotiated service enablement category ratio. The scores for the categories are then added to provide the system level score, via block 197.

Thus, serviceability scores are calculated for the system, for each category and each part. In addition, each part has a serviceability score for each category. As a result, a user can easily compare the scores of the whole system and parts within the system to targets. In addition, a user can readily determine which part to alter to improve a particular serviceability score. Thus, both evaluation and improvement of a system's serviceability is facilitated.

Figure 9:
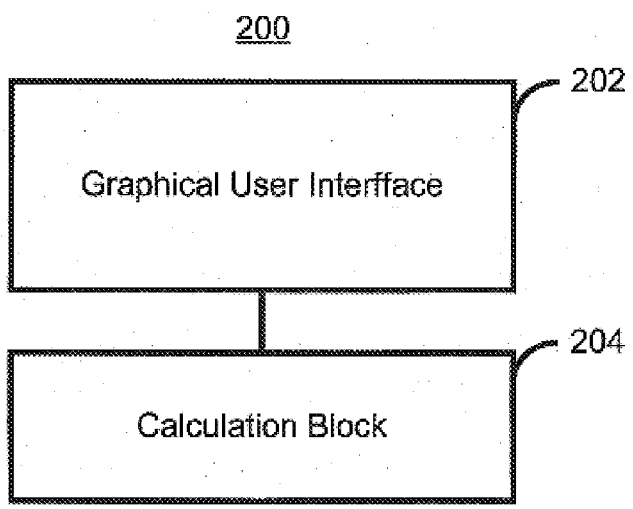
FIG. 9 is a block diagram of one embodiment of a system for evaluating serviceability in accordance with the present invention.

FIG. 9 is a high-level block diagram of one embodiment of a tool 200 for evaluating serviceability in accordance with the present invention. The tool 200 includes a graphical user interface ("GUI") 202 and a calculation block 204. The GUI 202 provides information to a user and allows information to be received from the user. For example, a portion of the GUI 202 may include a form having highlighted regions which the user fills out in order to perform the method 100 or 110. Another portion of the GUI 202, which is preferably displayed at a different time, provides the questions relating to serviceability of the system to the user and allows the user to select between possible answers. The calculation block 204 preferably converts the answers to numerical values and calculates the score for the system. Thus, the calculation block 204 performs the methods 150, 160, 175 and 190 described in FIGS. 5, 6, 7 and 8, respectively. Referring back to FIG. 9, the tool 200 is preferably implemented as a LOTUS 123™ workbook containing multiple spreadsheets.

Figure 10A:
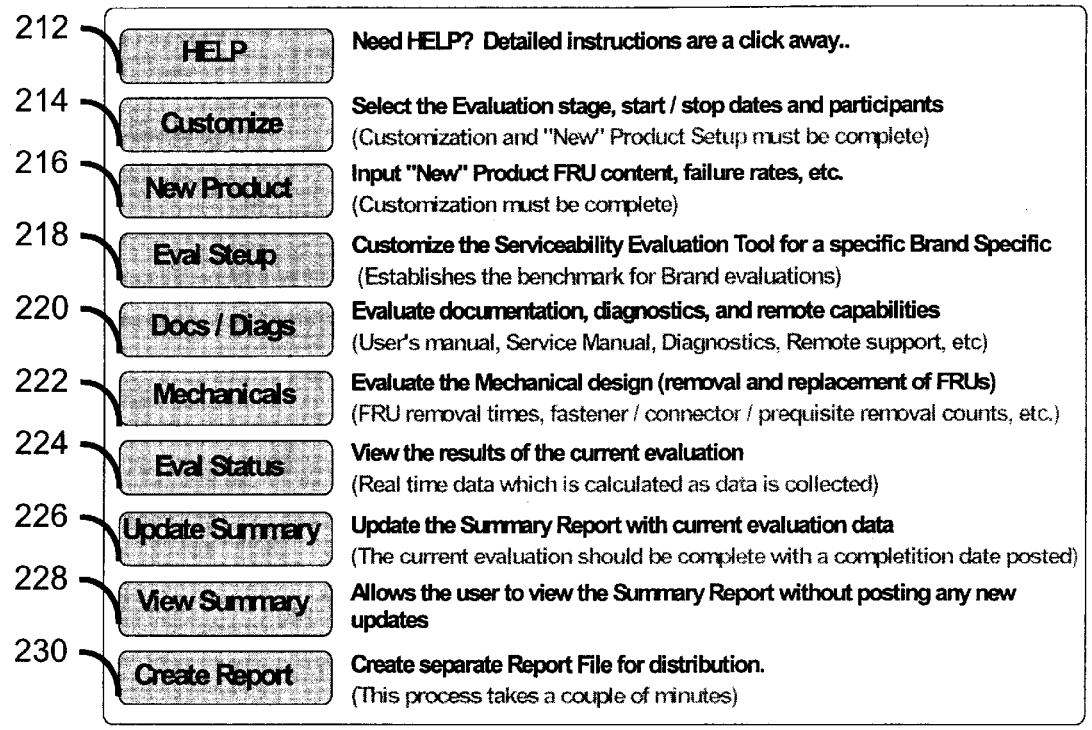
FIG. 10A is a diagram of one embodiment of a portion of a graphical user interface in accordance with the present invention.

FIG. 10A is a diagram of one embodiment of a portion of the GUI 202 in accordance with the present invention. The portion of the GUI 202 depicted is a main menu 210. The main menu 210 contains buttons 212, 214, 216, 218, 220, 222, 224, 226, 228 and 230 which allow the user to navigate to different functions of the tool 200 and thus perform various portions of the methods 100 and 110.

Figure 10B:
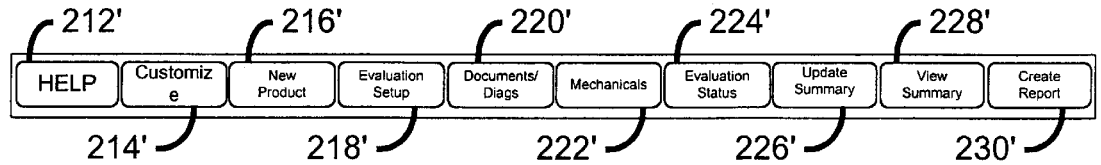
FIG. 10B is a diagram of one embodiment of another portion of a graphical user interface in accordance with the present invention.

FIG. 10B is a diagram of one embodiment of another portion of the GUI 202 in accordance with the present invention. The portion depicted is a toolbar 210'. The toolbar 210' contains buttons 212', 214', 216', 218', 220', 222', 224', 226', 228' and 230'. These buttons correspond to the buttons 212, 214, 216, 218, 220, 222, 224, 226, 228 and 230. The toolbar 210' appears when a user navigates to a particular portion of the system away from the main menu 210. Thus, the toolbar 210' allows the user to access functions easily.

Referring to FIGS. 10A and 10B, the function of the buttons 212, 214, 216, 218, 220, 222, 224, 226, 228 and 230 and the buttons 212', 214', 216', 218', 220', 222', 224', 226', 228' and 230' is described. The button 212 and 212' are help buttons which take the user to a help screen containing expanded versions of the questions being asked and more detailed user instructions. The buttons 214 and 214' are customization buttons which take the user to the portion of the GUI 202 which is used to customize the serviceability evaluation to a particular system, or product line. Once there, the user provides information about the product, its predecessors and competitors and can set targets for the system. Thus, portions of the steps 112 and 114 of the method 110 depicted in FIG. 3 may be performed at customization.

Referring back to FIGS. 10A and 10B, the buttons 216 and 216' are new product buttons which take the user to a portion of the GUI 202 that allows a user to input basic information about a new product within a set of products. The tool 200 is, therefore, prepared to accept new information for a serviceability evaluation of the new product. Thus, portions of the steps 112 and 114 of the method 110 depicted in FIG. 3 may be performed for the new product.

Referring back to FIGS. 10A and 10B, the buttons 218 and 218' are evaluation setup buttons which take a user to screens that allow a user to input information for a particular evaluation. As discussed above, four evaluations are preferably performed during development of a particular system. The evaluation setup allows a user to input information that customizes each of the four evaluations.

The buttons 220 and 220' are documents/diagnostics buttons that take a user to screens used in performing a portion of the evaluation. In a preferred embodiment the documents/diagnostics section allows the user to input the information as described in step 116 of the method 110 depicted in FIG. 3. Thus, information is collected about the contents and ease of use of the documentation and diagnostics being used to support the product for which serviceability is being evaluated.

The buttons 222 and 222' are mechanicals buttons which take the user to screens which allows parts to be removed. This section evaluates the time for removal of the part, items in the removal path for each part, the number of screws for each part, the number of connectors which must be removed, the opportunity for improper installation of the part and other impediments to removal of a part. Thus, a portion of the step 116 of the method 110 of FIG. 3, which obtains information about the system being evaluated, is performed in this section. In addition, this information might be employed by a user to determine which changes to make to the system to improve serviceability.

Referring back to FIGS. 10A and 10B, the buttons 224 and 224' are evaluation status buttons that take the user to screens which displays the results of the serviceability evaluation for information currently input to the tool 200. Thus, the user can view the results of the methods 100 and 110 depicted in FIGS. 2 and 3, respectively, as the methods are being performed.

Referring back to FIGS. 10A and 10B, the buttons 226 and 226' are update summary buttons that transfers data from the evaluation status screens, described above, to summary screens. The data for the particular evaluation (of four) is summarized in one portion of the screens. In a preferred embodiment, a single summary screen is used.

The buttons 228 and 228' are view summary buttons that take the user to the summary screens where the information for the evaluations being performed on the system is summarized. Thus, the user can actually view the summary data through the use of the buttons 228 and 228'.

The buttons 230 and 230' are create report buttons which create a printable report, preferably from the summary screens described above. Thus, a user is able to obtain a hard copy of the serviceability evaluation.

Thus, using the methods 100 and 110 and the tool 200, a user can obtain objective serviceability information, in the form of serviceability scores, about a product. The user can employ the serviceability scores in improving the serviceability of the product. Because the serviceability scores are objective, comparison between different products by different users is simplified and improved. Because the serviceability scores can cover different portions of the system and different categories of serviceability, the areas where the system needs improvement can be easily identified and changed. Thus, development of a system is facilitated.

A method and system has been disclosed for evaluating the serviceability of a system and, in one embodiment, improving serviceability based on the evaluation. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for evaluating a serviceability of a system comprising the steps of:
   (a) obtaining a comparison of the system with a plurality of criteria, the comparison including an objective measure of the serviceability of the system for each of the plurality of criteria;
   wherein the system includes a plurality of parts, wherein the plurality of criteria include serviceability criteria; and wherein the comparison obtaining step (a) further includes the step of
      (a1) obtaining the comparison for each of the plurality of parts with a corresponding portion of the plurality of criteria to provide the objective measure based on the serviceability of the system for the plurality of parts; and
   (b) calculating at least one serviceability score based on the comparison.

2. The method of claim 1 wherein the calculating step (b) further includes the step of:
   (b1) calculating a serviceability score for each of the plurality of parts.

3. The method of claim 1 further comprising the step of:
   (c) obtaining information relating to the plurality of parts, the information being used to calculate the serviceability score for each of the plurality of parts.

4. The method of claim 1 wherein the plurality of criteria provide can be organized into a plurality of categories, the plurality of categories including customer self help, support enablement and service enablement.

5. The method of claim 4 wherein the calculating step (b) further includes the step of:
   (b1) calculating a serviceability score for each of the plurality of categories.

6. The method of claim 1 wherein the comparison obtaining step (a) further includes the steps of:
   (a2) providing a plurality of questions corresponding to the plurality of criteria to a user, each of the plurality of questions having a particular set of possible answers; and
   (a3) allowing the user to answer the plurality of questions.

7. The method of claim 6 wherein each of the plurality of questions has a particular weight.

8. The method of claim 1 wherein the plurality of criteria further includes a measure of overall serviceability of the system.

9. The method of claim 1 further comprising the steps of:
   (c) determining whether the serviceability score is at least a target score; and
   (d) changing the system if the serviceability score is not at least the target score.

10. The method of claim 1 wherein the plurality of criteria include a plurality of categories, the plurality of categories including at least one of customer self help, support enablement, and service enablement.

11. A method for evaluating a serviceability of a system including a plurality of parts, the method comprising the steps of:
    (a) determining a plurality of criteria for judging serviceability of the system;
    (b) determining a plurality of questions for the system, the plurality of questions indicating the serviceability of the system, each of the plurality of questions having a particular set of possible answers, each of the plurality of questions corresponding to a portion of the plurality of parts,
    (c) providing the plurality of questions to a user;
    (d) allowing the user to provide a plurality of answers the plurality of questions; and
    (e) calculating a serviceability score for the plurality of parts based on the plurality of answers and the plurality of criteria;
    wherein a portion of the plurality of questions indicate a portion of the serviceability of the plurality of parts.

12. The method of claim 11 further comprising the step of:
    (f) calculating a plurality of serviceability scores for a plurality of categories, the plurality of categories capable of including customer self help, support enablement and service enablement.

13. The method of claim 11 further comprising the step of:
    (f) calculating a comprehensive serviceability score for the system.

14. The method of claim 11 further comprising the step of:
    (f) obtaining information relating to the plurality of parts, the information being used to calculate the serviceability score for each of the plurality of parts.

15. The method of claim 14 wherein the plurality of criteria further includes a measure of overall serviceability of the system.

16. The method of claim 14 further comprising the steps of:
    (g) determining whether the serviceability score is at least a target score; and
    (h) changing the system if the serviceability score is not at least the target score.

17. The method of claim 11 wherein each of the plurality of questions has a particular weight.

18. A computer-readable medium including a program for evaluating a serviceability of a system, the program including instructions for:
  (a) obtaining a comparison of the system with a plurality of criteria, the comparison including an objective measure of the serviceability of the system for each of the plurality of criteria;
  wherein the system includes a plurality of parts and wherein the comparison obtaining instructions (a) further includes instructions for
    (a1) obtaining the comparison for each of the plurality of parts with a corresponding portion of the plurality of criteria to provide the objective measure based on the serviceability of the system for the plurality of parts; and
  (b) calculating at least one serviceability score based on the comparison.

19. The computer-readable medium of claim 18 wherein the plurality of criteria include a plurality of categories, the plurality of categories including at least one of customer self help, support enablement, and service enablement.

20. A computer-readable medium containing a program for evaluating a serviceability of a system including a plurality of parts, the program including instructions for:
  (a) determining a plurality of criteria for judging serviceability of the system;
  (b) determining a plurality of questions for the system, the plurality of questions indicating the serviceability of the system, each of the plurality of questions having a particular set of possible answers, each of the plurality of questions corresponding to a portion of the plurality of parts;
  (c) providing the plurality of questions to a user;
  (d) allowing the user to provide a plurality of answers the plurality of questions; and
  (e) calculating a serviceability score for the plurality of parts based on the plurality of answers and the plurality of criteria;
  wherein a portion of the plurality of questions indicate a portion of the serviceability of the plurality of parts.

21. A tool for evaluating a serviceability of a system comprising:
  an interface for obtaining a comparison of the system with a plurality of criteria, the comparison including an objective measure of the serviceability of the system for each of the plurality of criteria; and
  means for calculating at least one serviceability score based on the comparison;
  where in the system includes a plurality of parts and wherein the comparison interface is further for obtaining the comparison for each of the plurality of parts with a corresponding portion of the plurality of criteria to provide the objective measure based on the serviceability of the system for the plurality of parts.

22. The tool of claim 21 wherein the calculating means further calculates a serviceability score for each of the plurality of parts.

23. The tool of claim 22 wherein the interface further obtains information relating to the plurality of parts, the information being used to calculate the serviceability score for each of the plurality of parts.

24. The tool of claim 21 wherein the plurality of criteria provide can be organized into a plurality of categories, the plurality of categories including customer self help, support enablement and service enablement.

25. The tool of claim 21 wherein the calculating means further calculates a serviceability score for each of the plurality of categories.

26. The tool of claim 21 wherein the interface further provides a plurality of questions corresponding to the plurality of criteria to a user, each of the plurality of questions having a particular set of possible answers and allows the user to answer the plurality of questions.

27. The tool of claim 26 wherein each of the plurality of questions has a particular weight.

28. The tool of claim 21 wherein the plurality of criteria further includes a measure of overall serviceability of the system.

29. The tool of claim 21 wherein the plurality of criteria include a plurality of categories, the plurality of categories including at least one of customer self help, support enablement, and service enablement.

30. A tool evaluating a serviceability of a system including a plurality of parts, the tool comprising:
  an interface for providing a plurality of questions to a user, the plurality of questions for the system, the plurality of questions indicating the serviceability of the system, each of the plurality of questions having a particular set of possible answers, each of the plurality of questions corresponding to a portion of the plurality of parts, the interface further allowing the user to provide a plurality of answers the plurality of questions; and
  means for calculating a serviceability score for the plurality of parts based on the plurality of answers and a plurality of criteria;
  wherein a portion of the plurality of questions indicate a portion of the serviceability of the plurality of parts.

31. The tool of claim 30 further comprising means for calculating a plurality of serviceability scores for a plurality of categories, the plurality of categories capable of including customer self help, support enablement and service enablement.

32. The tool of claim 30 further comprising means for calculating a comprehensive serviceability score for the system.

33. The tool of claim 31 wherein the interface further obtains information relating to the plurality of parts, the information being used to calculate the serviceability score for each of the plurality of parts.

34. The tool of claim 30 wherein each of the plurality of questions has a particular weight.

35. The tool of claim 30 wherein the plurality of criteria further includes a measure of overall serviceability of the system.

36. The tool of claim 30 further comprising:
  means for determining whether the serviceability score is at least a target score; and
  means for changing the system if the serviceability score is not at least the target score.

* * * * *